United States Patent [19]

Holland

[11] 4,147,829

[45] Apr. 3, 1979

[54] LAMINATED MATERIAL

[75] Inventor: Brian C. Holland, Chorley, England

[73] Assignee: Strewtex Fabrics Limited, Lancashire, England

[21] Appl. No.: 911,690

[22] Filed: Jun. 1, 1978

Related U.S. Application Data

[63] Continuation-in-part of Ser. No. 727,342, Sep. 28, 1976, abandoned.

[51] Int. Cl.$^2$ ................................................ B32B 3/26
[52] U.S. Cl. .......................................... 428/311; 2/81; 2/82; 5/343; 156/82; 428/313; 428/315; 428/321
[58] Field of Search ............... 428/310, 339, 311, 424, 428/313, 425, 315, 320, 321, 322; 2/2, 2.1 R, 2.1 A, 81, 2.5, 82; 156/82, 306; 5/343

[56] References Cited

U.S. PATENT DOCUMENTS

| | | | |
|---|---|---|---|
| 3,530,030 | 9/1970 | Adams et al. | 156/82 |
| 3,640,832 | 2/1972 | Kurz | 428/315 |
| 3,798,686 | 3/1974 | Gaiser | 5/343 |
| 3,817,818 | 6/1974 | Riding et al. | 428/315 |

FOREIGN PATENT DOCUMENTS

| | | | |
|---|---|---|---|
| 1350077 | 12/1963 | France | 428/313 |
| 2295837 | 7/1976 | France | 428/313 |

Primary Examiner—William J. Van Balen
Attorney, Agent, or Firm—Fleit & Jacobson

[57] ABSTRACT

Clothing material made from a layer of polyurethane foam having heat reflective material flame bonded to one face and weatherproof fabric flame bonded to the other face. The invention also includes clothing made from the material.

10 Claims, No Drawings

LAMINATED MATERIAL

This application is a continuation in part of my application Ser. No. 727,342 filed on Sept. 28, 1976, now abandoned.

This invention relates to a laminated material and more particularly but not exclusively a laminated material suitable for making up into clothing and clothing so made.

It has long been known that persons who are exposed to low temperature conditions, for example due to the nature of their work or place of residence, must wear clothing which will retain body heat. Many proposals have been made heretofore to that end. However, it has been found that protective clothing which provides sufficient insulation for persons to work without substantial loss of body heat, for example, on North Sea oil rigs, is so bulky that persons so clad cannot move around with the agility necessitated by the tasks they have to perform.

It is an object of the present invention to provide a material which can be made up into clothing for wearing in conditions where body heat is to be conserved without unduly restricting the freedom of movement of the wearer.

To meet that object the present invention provides a laminated clothing material comprising a layer of foamed polyurethane, said layer being from 2 to 6 mm thick and having a first inner face and a second outer face; a heat reflective layer flame bonded to said first face and a layer of weatherproof fabric flame bonded to said second face; said heat reflective layer comprising a flexible plastics support layer and a layer of metal deposited on one side thereof.

The metal layer in the heat reflective layer preferably comprises a metal foil, for example aluminium foil. Conventional aluminium foil such as is used for domestic purposes has rather low strength and it is, therefore, necessary to use as the heat reflective layer a flexible plastics support on which a metal such as aluminium has been deposited, for example by vacuum deposition. The thickness of the reflective layer is for example 0.0005 inches.

The foamed plastics material comprises a polyurethane foam and preferably a polyester urethane foam. The foam may have open or closed cells. The heat reflective layer, the foamed plastics material and the weatherproof layer are laminated together by flame bonding.

The laminated material of the present invention is intended to be made up into garments or other protective coverings in such a way that the reflective coating is adjacent the wearer. The side of the foam layer remote from the heat reflective layer, i.e. on the outer side of a garment made with the material, is covered with a suitable weatherproof material, e.g. material which is waterproof and/or windproof. One example of such a material is a non-woven polyolefin fabric sold under the Trade Mark "TYVEK" which is both weather resistant and resistant to attack by chemicals. Generally, fabrics of nylon or polyolefin are preferred having a weight of 2 to 5 oz/sq yard.

The thickness of the foam layer is not critical within the defined limits, but is preferably chosen so as to provide the maximum insulation consistent with preserving the minimum thickness. The insulating property of the foamed plastics layer depends, inter alia, upon the cell size and thus the thickness of the foamed layer will be chosen having regard also to the nature of the foamed plastics material employed. For most applications foamed plastics of a thickness of from 2 to 5 mm can be employed.

The laminate material of the present invention is very light and strong and can be made up into garments or other articles by sewing. A one piece garment which completely covers a person except for the head, feet and hands can be worn without restricting the movements of the wearer to any significant degree and is thus particularly useful for persons who have to perform manual tasks in conditions such as those found on North Sea oil rigs. In order to render such a garment weatherproof, it is important, should the foam layer be made of an open cell foam, that the outer side of the foam layer be covered, as by the non-woven fabric as aforesaid, and that the seams of the garment or article be sealed, for example with a waterproof tape.

The exposed surface of the weatherproof layer may be coloured or dyed for example with fluorescent pigment.

The material of the present invention may be used in many ways. Thus in addition to protective clothing, the material may be made into sleeping bags, survival bags or muffs to prevent hypothermia in persons injured or in the aged. The material can also be used to make underclothes.

The following Example further illustrates the invention.

A laminate was formed from the following three layers together;
  Outer waterproof layer: A woven polyamide fabric coated with "Vitapruf" 297
  Foam layer: Polyester urethane of 4.0 mm thickness and 26 kg/m$^3$ ($\pm$5%) density
  Inner layer: Polyester urethane flexible sheet with aluminium metal vacuum deposited on one face thereof; overall thickness 12 microns and weight 18 g/m$^2$ The three layers were flame bonded together, the bond strengths between adjacent layers exceeding 5.6 Newtons/50 mm. The resulting material had excellent heat insulation properties but was quite sufficiently flexible to enable unrestrictive protective clothing to be made therefrom.

I claim:

1. A laminated clothing material comprising a layer of foamed polyurethane, said layer being from 2 to 6 mm thick and having a first inner face and a second outer face, a heat reflective layer flame bonded to said first face and a layer of weatherproof fabric flame bonded to said second face; said heat reflective layer comprising a flexible plastics support layer and a layer of metal deposited on one side thereof.

2. A laminated clothing material as claimed in claim 1, wherein the weatherproof fabric is a woven polyamide fabric coated with polyurethane.

3. A laminated clothing material as claimed in claim 1, wherein the heat reflective layer comprises a flexible polyester urethane sheet having aluminium metal deposited on one side thereof.

4. A laminated clothing material as claimed in claim 1, wherein the foam has open cells.

5. A laminated clothing material as claimed in claim 1, wherein the foam has closed cells.

6. Clothing for conserving body heat made from material comprising a layer of foamed polyurethane, said layer being from 2 to 6 mm thick and having a first inner face and a second outer face; a heat reflective layer flame bonded to said first face and a layer of weatherproof fabric flame bonded to said second face; said heat reflective layer comprising a flexible plastics support layer and a layer of metal deposited on one side thereof.

7. Clothing as claimed in claim 4, wherein the weatherproof fabric is a woven polyamide fabric coated with polyurethane.

8. Clothing as claimed in claim 4, wherein the heat reflective layer comprises a flexible polyester urethane sheet having aluminium metal deposited on one side thereof.

9. Clothing as claimed in claim 4, wherein the foam has open cells.

10. Clothing as claimed in claim 4, wherein the foam has closed cells.

UNITED STATES PATENT AND TRADEMARK OFFICE
CERTIFICATE OF CORRECTION

PATENT NO. : 4,147,829
DATED : April 3, 1979
INVENTOR(S) : Brian Charles HOLLAND It is certified that error appears in the above-identified patent and that said Letters Patent are hereby corrected as shown below:

In Section [73], after "Assignee:", change "Strewtex" --Strentex--.

Signed and Sealed this

Twentieth Day of November 1979

[SEAL]

Attest:

RUTH C. MASON
Attesting Officer

LUTRELLE F. PARKER
Acting Commissioner of Patents and Trademarks